United States Patent [19]
Kall

[11] Patent Number: 5,358,364

[45] Date of Patent: Oct. 25, 1994

[54] SETUP DEVICE AND METHOD FOR MILLING MACHINES

[76] Inventor: Ronald J. Kall, 4758 W. 11th St., Cleveland, Ohio 44109

[21] Appl. No.: 116,909

[22] Filed: Sep. 7, 1993

[51] Int. Cl.⁵ ............................................ B23Q 16/00
[52] U.S. Cl. ...................................... 409/131; 33/638; 33/642; 408/2; 409/218
[58] Field of Search .................... 408/2; 409/131, 133, 409/204, 218, 230; 33/201, 626, 628, 630, 638, 642

[56] References Cited

U.S. PATENT DOCUMENTS

| | | | |
|---|---|---|---|
| 4,629,378 | 12/1986 | Parsons | 409/133 |
| 4,753,555 | 6/1988 | Thompson et al. | 409/133 |
| 5,066,176 | 11/1991 | Johnstone | 409/133 |

FOREIGN PATENT DOCUMENTS

| | | | |
|---|---|---|---|
| 404581 | 1/1934 | United Kingdom | 408/2 |
| 461052 | 2/1937 | United Kingdom | 408/2 |

*Primary Examiner*—Daniel W. Howell
*Attorney, Agent, or Firm*—Renner, Otto, Boisselle & Sklar

[57] ABSTRACT

A setup device for a milling machine includes a spindle having a rotatable element and a spindle mount for mounting the spindle with the axis of rotation of the rotatable element being at a known location relative to the machining process of the milling machine. A related method of positioning a milling machine relative to a part is also disclosed.

6 Claims, 3 Drawing Sheets

SETUP DEVICE AND METHOD FOR MILLING MACHINES

FIELD OF THE INVENTION

The present invention is related generally to a device and method which facilitates accurately establishing the location of a part to be machined with respect to a machining process, and, more particularly, to a setup spindle and method for accurately establishing the precise location of a part with respect to the machining process of an electrostatic discharge milling machine, laser cutting machine or similar machine which does not employ a rotatable spindle.

BACKGROUND OF THE INVENTION

Many conventional machining devices include a spindle which rotates a tool at a high speed to perform a milling, grinding, boring or similar machining process. Accurately positioning the tool relative to the part to be machined in these conventional devices is relatively easy because of the spindle. To accurately establish the relative coordinate position of the part, the spindle is rotated around a predetermined feature on the part, for example, a bore hole, a protruding hub, or a milled pocket and appropriate adjustments are made to the positioning of the spindle so that it is centered with respect to the predetermined feature on the part. Since the orientation and location of the predetermined feature of the part is known relative to the overall morphology of the part, the offset positioning of the machining tool relative to the part can be accurately determined.

However, some types of machining devices such as Electric Discharge Machining (EDM) machines and laser cut machines do not employ a tool mounted in a rotatable spindle to perform the desired milling or cutting operation. Consequently, these types of devices do not have a rotatable spindle which could be used to establish the position of the machining process relative to the part to be machined. For that reason it is often difficult and time consuming to establish accurately the relative position of the machining process and the part of these types of machining devices.

It would be desirable to provide EDM machines, laser cut machines and similar machines with a device which facilitated the accurate relative positioning of a machining process with respect to the part to be machined.

SUMMARY OF THE INVENTION

The present invention provides a device and method for relatively easily establishing the location of the machining process of an EDM machine, laser cut, plasma cut, or similar machine relative to the part to be machined through the use of a spindle located at a known position from the machining process. By determining the location of the part relative to the spindle, the location relative to the machining process can also be determined since the offset between the spindle and machining process is known from the initial calibration of the spindle.

In accordance with one aspect of the present invention a setup device for a milling machine includes a spindle having a rotatable element and a mount for mounting the spindle with the axis of rotation of the element at a known location relative to the machining process of the milling machine.

In accordance with another aspect of the present invention, a method of positioning a machine relative to a part to be machined includes the steps of: creating a feature in a fixture using the machining process of a machine when the machining process is at a known position; determining the center of the created feature by rotating a rotatable element of a spindle attached to the machine; calculating the offset of the part relative to the machine as a function of the position of the machining process when the feature is created and the position of the spindle when the center of the created feature was determined by use of the spindle; determining the location of a part to be machined relative to said machine by rotating the rotatable element of the spindle to find a specific feature having a known position on the part; and offsetting the machining process by the calculated offset.

In accordance with a further aspect of the invention, a method of positioning a machine relative to a part to be machined includes the steps of: determining the center of a through hole in a fixture by rotating a rotatable element of a spindle attached to the machine; determining said center using the machining process of the machine; calculating the offset of the part relative to the machine for determining the center of the through hole using said spindle as opposed to using the machining process; determining the location of a part to be machined relative to the machine by rotating the rotatable element of the spindle to find a specific feature having a known position on the part; and offsetting the machining process by the calculated offset.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

DETAILED DESCRIPTION OF THE PREFERRED EMBODIMENTS OF THE INVENTION

Figure 1:
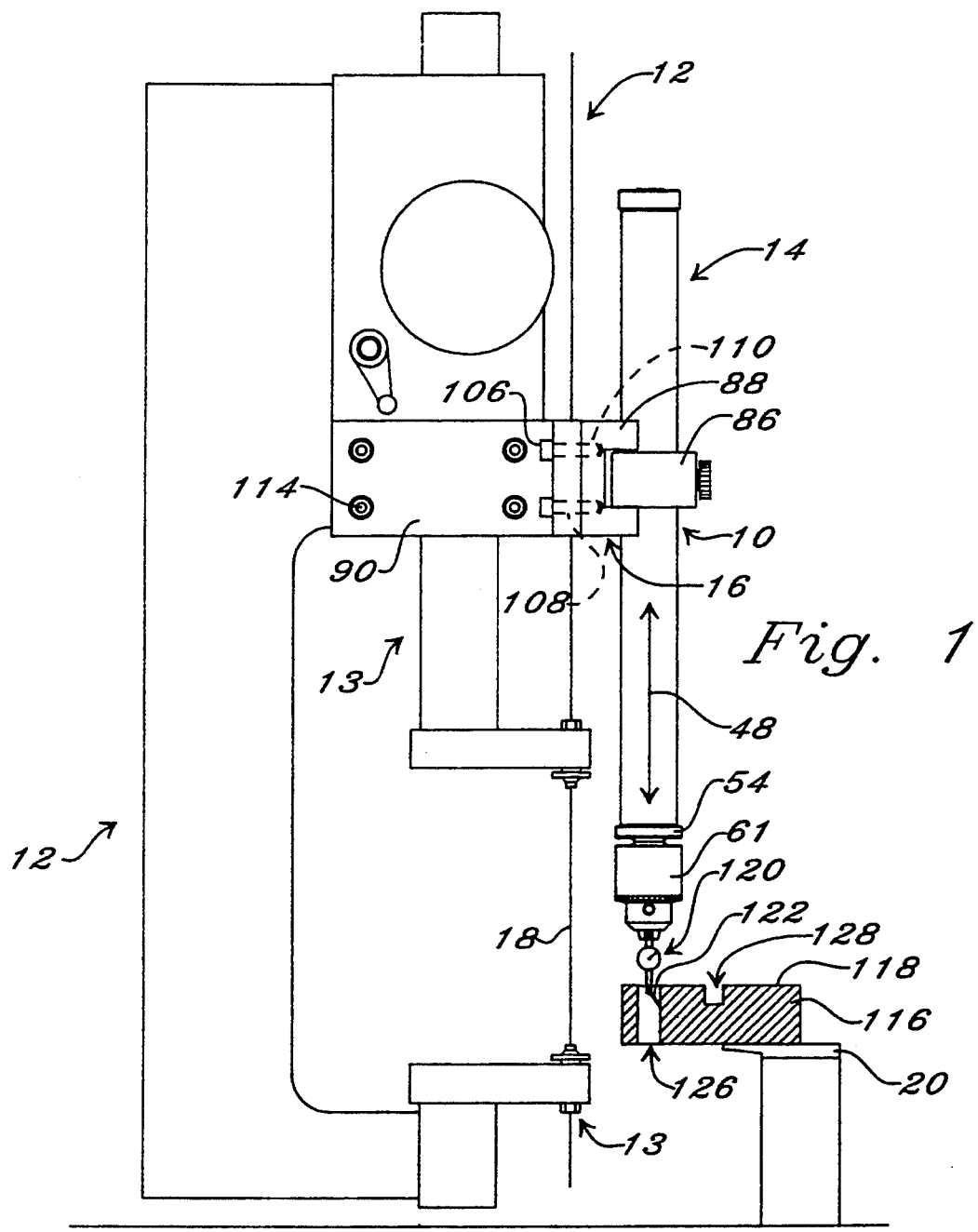
FIG. 1 is an elevational view of a milling machine having the setup spindle of the present invention mounted thereto.

Referring to the several figures and initially to FIG. 1, there is shown a setup spindle device 10 in accordance with an embodiment of the present invention mounted on a wire EDM machine (generally designated at 12). The setup spindle device 10 includes an elongate, cylindrical spindle 14 and a mounting apparatus 16 for securing the spindle 14 to the wire EDM machine 12 at a known position relative to the wire electrode 18 of the EDM machine. The mounting apparatus 16 secures the spindle 14 to the wire EDM machine 12 at a location, such as the machining head 13 to which the wire electrode 18 is attached, which will cause the spindle to move relative to the work table 20 of the machine in the same manner as the wire electrode. Consequently, the spindle 14 can be caused to move, through appropriate commands to the position controller of the wire EDM machine 12, as the wire electrode 18 would move, but with a known offset. In this manner the spindle 14 can be used to establish the accurate position of the wire electrode 18 relative to a part to be machined employing much of the conventional methodology used in positioning machines having a spindle for rotating a milling or cutting tool.

While the description of the invention herein predominately is related to a setup spindle used in connection with a wire EDM machine, the use of a wire EDM machine in the description is merely exemplary. The setup spindle of the present invention may be used in connection with any milling, cutting, or similar machine which does not employ a spindle, such as EDM, laser or plasma cut machines, and in fact, may be used in connection with such conventional machines including spindles in circumstances where it is desirable that the spindle used for holding a milling or cutting tool not be also used for positioning the tool relative to the part to be machined.

Figure 2:
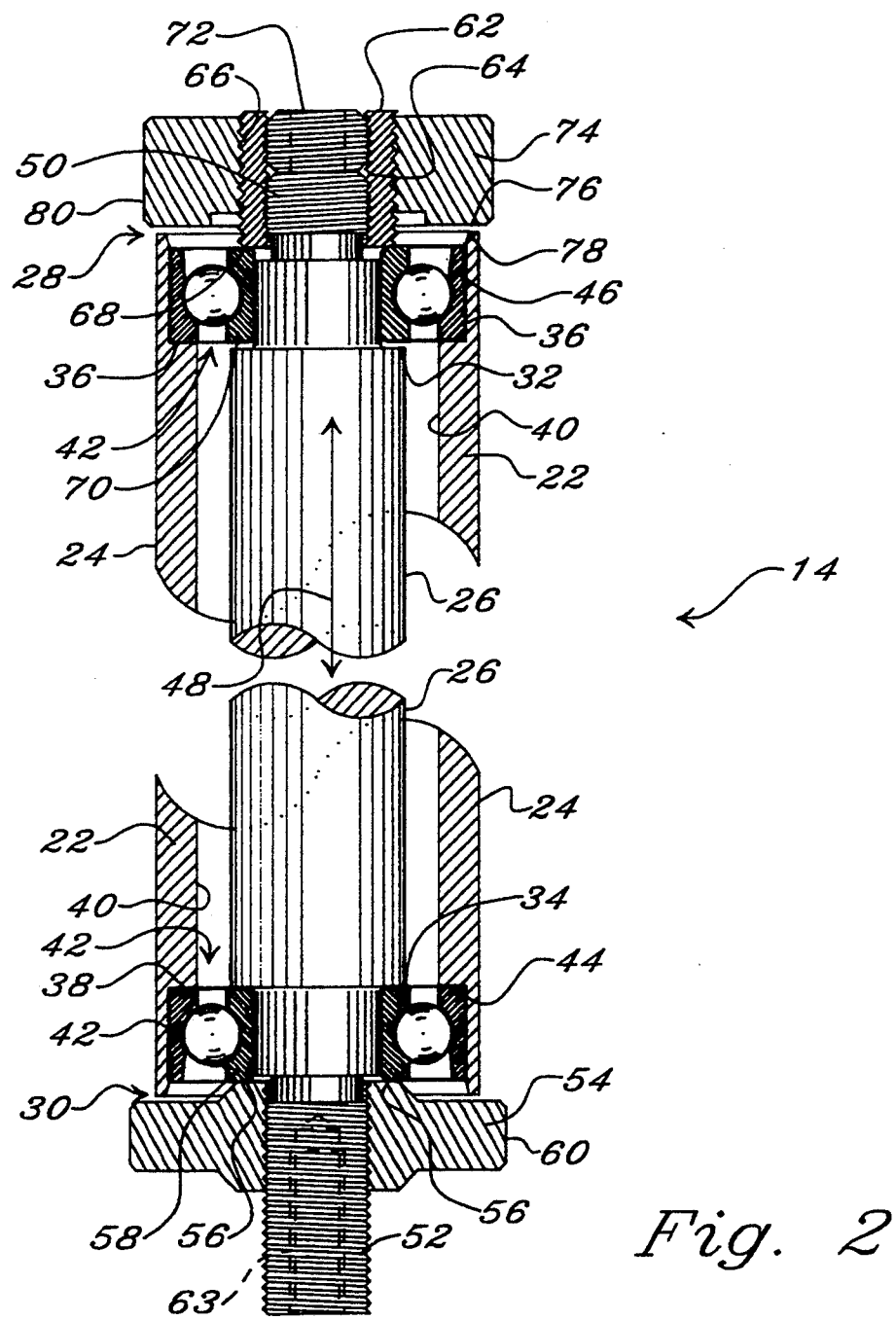
FIG. 2 is an enlarged cross-sectional view of the spindle of the present invention; and, FIG. 3 is an enlarged illustration of the mounting assembly of the present invention.

Turning then to FIG. 2 there is shown a partial, enlarged cross-sectional view of the spindle 14. The spindle 14 includes a hollow, cylindrical quill 22 which extends substantially the length of the spindle and forms the outer surface 24 of the spindle. The quill 22 preferably is manufactured with a high degree of accuracy since the accuracy of the location of the wire electrode 18 relative to the part is dependent upon the accuracy of the offset between the spindle 14 and the wire electrode. Disposed within the quill 22 is a shaft 26 which extends the length of the quill 22 and extends beyond each axial end 28, 30 of the quill. The diameter of the shaft 26 is reduced near each end 28, 30 of the quill 22 to form shoulders 32, 34, respectively. Shoulders 36, 38 are formed at the same axial spacing on the inner surface 40 of the quill 22 by increasing the diameter of the inner surface of the quill near the ends 28, 30, respectively of the quill. Disposed within the areas 42 created by the reduced diameter of the shaft 26 and the increased diameter of the inner surface 40 of the quill 22 are ball bearings 44, 46 which accurately position the shaft 26 concentrically within the quill 22 while permitting the shaft to rotate freely about the longitudinal axis 48 of the quill.

The shaft 26 terminates beyond the upper end 28 of the quill 22 in a threaded section 50 and beyond the opposite or lower end 30 in a threaded section 52, both of a reduced diameter as compared to the major extent of the shaft. A knob 54 and extends radially outwardly past the outer surface 24 of the quill 22 and is threadedly secured to the threaded portion 52 of the shaft 26. When the knob 54 is tightly secured upon the threaded portion 52 of the shaft 26, axially projecting shoulder 56 firmly contacts the inner race 58 of the ball bearing 44 pressing the ball bearing against the shoulder 34 and securing the ball bearing to the shaft. Since the knob 54 firmly engages the inner race 56 of the ball bearing 44 and thus the shoulder 34 of the shaft 26, the knob will rotate with the shaft relative to the quill 22. The outer surface 60 of the knob 54 extending radially outwardly past the outer surface 24 of the quill 22 is preferably knurled to provide a hand grip to facilitate rotation of the shaft 26 relative to the quill 22. The threaded portion 52 of the shaft 26 extending beyond the knob 54 permits a fastening device, such as the chuck 61 shown in FIGS. 1 and 3, to be secured to the shaft through the external threads of the threaded portion of the shaft or through an internally threaded blind axial hole 63 in the end of the threaded portion of the shaft. The chuck permits a test or dial indicator or other measurement tool to be attached to the shaft 26 for accurate position, control and rotation of the test indicator.

The threaded portion 50 of the shaft 26 extending beyond the upper end 28 of the quill 22 is threadedly secured to a nut sleeve 62 having inner and outer threaded surfaces 64, 66, respectively. The end 68 of the nut 62 contacts the inner race 70 of the ball bearing 46 and urges the ball bearing towards the shoulder 32 of the shaft 26 and the shoulder 36 of the quill 22 when tightened, while pulling the major extent of the shaft toward the end 28 of the quill 22 to remove any axial slack from the shaft, the quill, and the bearings 44, 46. A recessed head set screw 72 in threaded engagement with the inner threaded surface 64 of the nut 62 locks the nut in position relative to the threaded portion 50 of the shaft 26. A spindle lock nut 74 having an axially projecting lower end face 76 is threadedly secured to the outer threaded surface 66 of the nut 62 which serves to lock the shaft 26 in place relative to the quill 22 as the end face engages the end surface 78 of the quill when tightened upon the nut 62. Preferably, the spindle lock 74 is provided with a knurled outer surface 80 extending beyond the outer surface 24 of the quill 22 to facilitate tightening of the spindle lock against the quill as well as loosening of the spindle lock from the quill.

Figure 3:
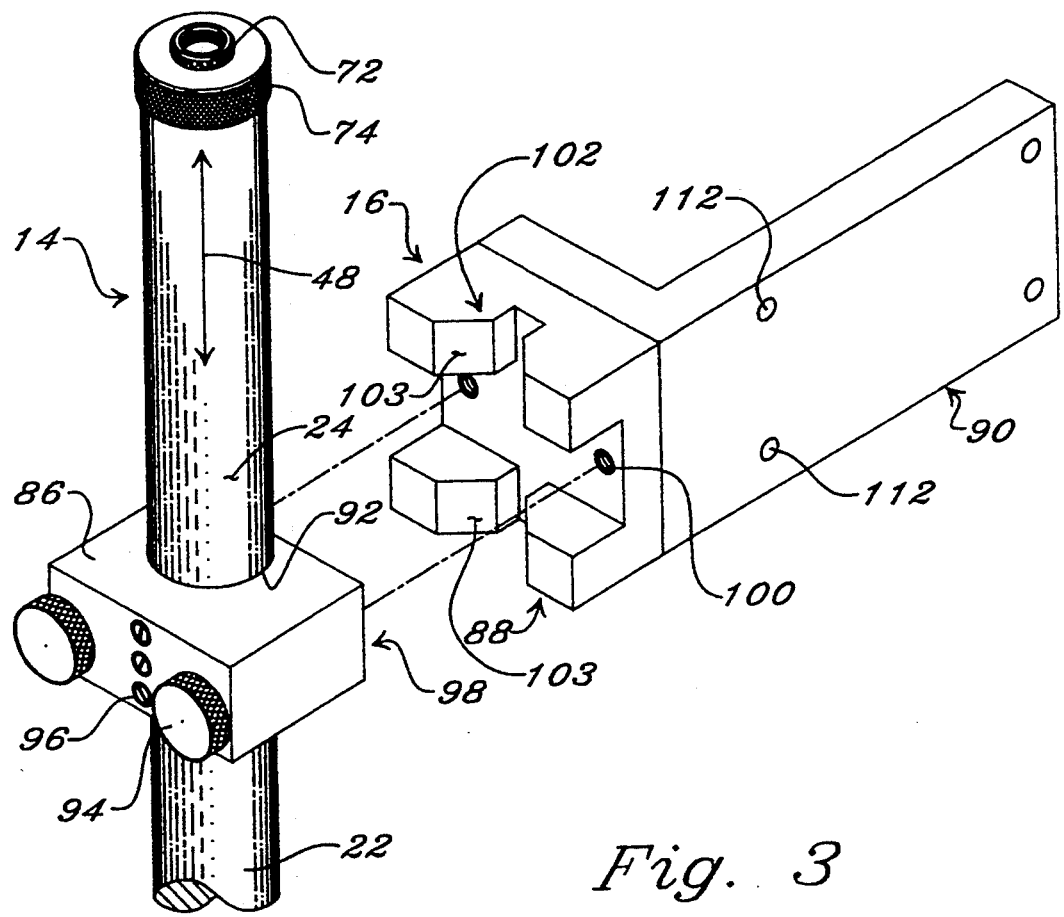

FIG. 3 is an enlarged illustration of the mounting apparatus 16 which secures the spindle 14 to a machine, such as the EDM machine 12 as shown in FIG. 1, or a laser cut, plasma cut or similar machine. The mounting apparatus 16 includes a clamp 86, a mount 88 and an adaptor 90 for securing the spindle 14 to a machine. The clamp 86 includes a through hole 92 through which the quill 22 of the spindle 14 is disposed, a pair of thumb screws 94 for tightening the clamp 86 and spindle 14 against the mount 88, and one or more spring pins 96 which exert a force against the outer surface 24 of the quill 22 to keep the spindle 14 from slipping when the clamp 86 and spindle are not tightly secured to the mount 88.

The mount 88 is adapted to receive an end 98 of the clamp 86 and a portion of the quill 22 of the spindle 14. The mount 88 further includes a number of threaded holes 100 for engagement with the thumb screws 94 and a generally V-shape groove 102 forming surfaces 104 which presses against the outer cylindrical surface of the quill 22 of the spindle 14 when the clamp 86 is tightened against the mount 88. The surfaces 103 of the V-shape groove 102 tend accurately to align the spindle 14 in the same orientation each time it is mounted to the mount 88 so that the spindle and clamp 86 can be removed from the mount, such as for use with a different machine, and later accurately reattached. The mount 88 mounts directly to the adaptor 90 by a number of bolts 106 (See FIG. 1) which pass through clearance holes 108 in the adaptor to engage threaded holes 110 in the mount allowing for adjustment of the mount relative to the adaptor. The adaptor 90 further includes through clearance holes 112 through which bolts 114 pass to mount the adaptor to an existing bolt or bolt hole pattern on the desired machine. The clearance holes 112 allow adjustment of the adaptor 90 relative to the machine in a plane perpendicular to the plane of adjustment permitted between the adaptor and mount 88 by the clearance holes 108 in the adaptor.

Using the mounting assembly 16 of the present invention, a number of adaptors 90 and mounts 88 may be used in conjunction with one spindle 14 and clamp 86. For example, adaptors 90 specifically configured to mount to a particular machine and corresponding mounts 88 may be secured to each machine for which the setup spindle device 10 of the present invention would be used. A single spindle 14 and clamp 86 could then be transferred between machines and easily attached to the existing mount 88 and adaptor 90 on each machine. Further, because of the surfaces 103 of the V-shape groove 102 in the mounts 88, the spindle 14 will be reliably accurately relocated with reference to the wire electrode or other machining process of that machine, thereby eliminating the need for further calibration or simplifying recalibration.

When the setup spindle 10 is first mounted to a machine, it must be calibrated to determine the offset between the spindle 14 and the machining process of the machine. For an EDM machine, such as the EDM machine 12 shown in FIG. 1, the spindle 14 is aligned so that the central axis 48 of the spindle 14 is substantially parallel to the wire electrode 18. This is preferably done by fastening a fixture 116 having a known flat surface 118 to the work table 20 of the machine 12 and shimming the fixture so that the flat surface 118 is parallel to the plane of X-Y travel of the work table. A test indicator 120 having an indicator arm 122 is then mounted in chuck 61 secured to the threaded portion 52 of the shaft 26. The spindle 14 is then lowered until the indicator arm 122 rests on the flat surface 108. The chuck 61 and attached test indicator 120 are then rotated through the four directional quadrants X+, Y+, X−, Y− and the mount 88 and adaptor 90 are adjusted relative to one another and the machine 12 through the clearances provided in the clearance holes 108 and 112, respectively, until the reading of the test indicator 110 is invariant, indicating that the central axis 48 of the spindle 14 is parallel to the wire electrode 18.

The offset of the central axis 48 of the spindle 14 is then determined relative to the electrode wire 18. This is done by clamping the test fixture 116 to the work table 20 in a position that will permit a test through hole 126 in the fixture to be accessed by both the setup spindle 10 and the wire electrode 18. With a test indicator 120 inserted in the chuck 61, the spindle 14 is positioned so that the indicator arm 122 contacts the periphery or inside wall of the through hole 126 (as shown in FIG. 1). The test indicator 120 is then rotated, such as by turning the knob 54 by hand, and its position is adjusted through appropriate movements of the machining head 13 relative to the work table 20 so that the readout of the test indicator is invariant when the test indicator is rotated 360°, thus indicating that the spindle is centered in the hole 126. Movement of the machine 12 relative the work table 20 is preferably accomplished by entering appropriate commands and coordinates into a computerized position controller provided with the machine which translates the commands and coordinates into appropriate movement of the machining head 13 relative to the work table. The readouts of the position controller of the machine 12 are then zeroed in both the X and Y coordinates. Next, the spindle 14 is lifted out of position, and the machine 12 is repositioned so that the wire electrode 18 may be threaded through the hole 126. The wire electrode is used to find the center of the hole 126 in a conventional manner. The X and Y positions on the readouts of the position controller of the machine 12 then indicate the offset between the wire electrode 18 and the central axis 48 of the spindle 14. A conventional manner of finding a hole center with an EDM machine includes moving the electrode threaded through the hole in one direction until it contacts the inside wall of the hole and then moving the electrode in the opposite direction until it contacts the inside wall of the hole on the other side, thus finding one coordinate of the hole center. The electrode is then moved back one half of the distance toward the point at which it first contacted the inner wall of the hole. This process is then repeated in a perpendicular direction to find the other coordinate of the hole center.

For a laser cut machine normality is determined the same way but the offset between the central axis 48 of the spindle 14 and the laser beam is determined by using the laser to cut a round hole in a test fixture about a known position, with the position coordinates of the position controller of the machine being zeroed. The setup spindle 10 is then positioned over the test hole and, using the test indicator 110 mounted in the chuck 61, the center of the hole 126 is determined as described above, thus establishing the offset between the central axis 48 of the spindle 14 and laser.

Once the offset of the spindle 14 from the wire electrode 18 or other machining process is known, the machining process can be accurately positioned relative to the part to be machined by use of the setup spindle. The setup spindle 14 or work table 20 are moved relative to each other to move a known feature of the part to be machined, for example, the center of a blind hole 128 into position beneath the spindle 14. (For illustrative purposes the blind hole is shown in the test fixture 116.) The indicator arm 122 of the test indicator 120 mounted to the chuck 61 is then lowered into the blind hole 128 to contact the periphery of the hole. The test indicator is then rotated and the location of the part relative to the machine is adjusted until the readout of the test indicator 120 is invariant, thus indicating that the center of the blind hole 128 has been found. Since the position of the central axis 48 of the spindle 14 relative to the part and the offset between the spindle and the machining process are known, the location of the part relative to the machining process is also known. The spindle 14 may also be used for determining flatness of the part to be machined by rotating the test indicator 120 or by fixing the rotational position of the test indicator through use of the spindle lock 74 and by moving the work table 20 and spindle relative to one another and checking flatness by the readout of the test indicator.

What is claimed is:
1. A setup device for a milling machine; comprising:
 a spindle having a rotatable element; and
 mounting means for mounting said spindle with the axis of rotation of said element at a known location relative to the machine process of the milling machine, said mounting means including a V-shaped recess adapted to receive a portion of said spindle.
2. The device of claim 1, wherein said rotatable element includes a chuck for mounting an indicator to said spindle.
3. The device of claim 1, wherein said mounting means mounts said spindle parallel to the cutting process of the milling machine.

4. The device of claim 1, wherein said mounting means includes means for permitting adjustment of said spindle in a vertical direction.

5. A method of positioning a machine relative to a part to be machined, comprising the steps of:
   a) creating a feature in a fixture using the machining process of a machine when the machining process is at a known position;
   b) determining the center of said created feature by rotating a rotatable element of a spindle attached to the machine;
   c) calculating the offset of the part relative to the machine as a function of the position of the machining process when said created feature was created and the position of said spindle when the center of said created feature was determined by use of the spindle;
   d) determining the location of a part to be machined relative to said machine by rotating said rotatable element of said spindle to find a specific feature having a known position on said part; and
   e) offsetting said machining process by said calculated offset.

6. A method of positioning a machine relative to a part to be machined, comprising the steps of:
   a) determining the center of a through hole in a fixture by rotating a rotatable element of a spindle attached to the machine,
   b) determining said center using the machining process of the machine;
   c) calculating the offset of the part relative to the machine for determining said center using said spindle as opposed to using said machining process;
   d) determining the location of a part to be machined relative to said machine by rotating said rotatable element of said spindle to find a specific feature having a known position on said part; and
   e) offsetting said machining process by said calculated offset.

* * * * *